United States Patent
Hardy et al.

(10) Patent No.: US 12,493,838 B2
(45) Date of Patent: Dec. 9, 2025

(54) TRANSLATION DECISION ASSISTANT

(71) Applicant: SDL Limited, Maidenhead (GB)

(72) Inventors: Matthew William McKnight Hardy, Sheffield (GB); Rares Ionut Vasilescu, Floresti (RO)

(73) Assignee: SDL Limited, Maidenhead (GB)

( * ) Notice: Subject to any disclaimer, the term of this patent is extended or adjusted under 35 U.S.C. 154(b) by 0 days.

(21) Appl. No.: 17/964,453

(22) Filed: Oct. 12, 2022

(65) Prior Publication Data

US 2024/0127146 A1    Apr. 18, 2024

(51) Int. Cl.
   *G06Q 10/0631* (2023.01)
   *G06F 16/906* (2019.01)
   *G06F 16/93* (2019.01)

(52) U.S. Cl.
   CPC ..... *G06Q 10/06313* (2013.01); *G06F 16/906* (2019.01); *G06F 16/93* (2019.01)

(58) Field of Classification Search
   None
   See application file for complete search history.

(56) References Cited

U.S. PATENT DOCUMENTS

| | | | | |
|---|---|---|---|---|
| 6,623,529 B1 * | 9/2003 | Lakritz | ............... | G06F 16/9535 715/205 |
| 7,207,005 B2 * | 4/2007 | Lakritz | ................. | G06F 40/197 715/201 |
| 8,489,980 B2 * | 7/2013 | Lakritz | ................... | G06F 40/40 715/239 |

(Continued)

FOREIGN PATENT DOCUMENTS

| | | | | |
|---|---|---|---|---|
| EP | 3026614 A1 * | 6/2016 | ....... | G06Q 10/06311 |
| GB | 2558062 A * | 7/2018 | ............. | G06F 40/51 |

(Continued)

OTHER PUBLICATIONS

Carter, Dave, and Diana Inkpen. "Searching for poor quality machine translated text: Learning the difference between human writing and machine translations." Advances in Artificial Intelligence: 25th Canadian Conference on Artificial Intelligence, Canadian AI 2012, May 28-30, 2012. (Year: 2012).*

(Continued)

*Primary Examiner* — Timothy Padot
*Assistant Examiner* — Derick J Holzmacher
(74) *Attorney, Agent, or Firm* — Carr & Ferrell LLP

(57) ABSTRACT

A method and system for providing a translation decision assistant are provided. In an exemplary method, a document is processed to determine a job value and document insights. A machine learning aggregation process extracts resources including people, machine translation engines, terminology, and workflows. The machine learning aggregation process from prior training selects resources from various evaluations. A constraint filter processes the resources with external constraints including hard constraints and soft constraints. The constraint filter outputs ranked resources by cost, quality, and time. A decision filter step selects the best resources from the constraint filter outputs based on the job value and time, cost, and quality criteria and presents to a user or allows Translation Management System to make automated allocation and routing decisions.

20 Claims, 4 Drawing Sheets

(56) References Cited

U.S. PATENT DOCUMENTS

| | | | |
|---|---|---|---|
| 10,255,277 B2 | 4/2019 | Zhang et al. | |
| 10,541,973 B2* | 1/2020 | Lakritz | G06F 40/40 |
| 10,740,558 B2 | 8/2020 | Ukrainets et al. | |
| 11,010,284 B1* | 5/2021 | Santiago | G06N 20/00 |
| 11,361,170 B1 | 6/2022 | Shastry et al. | |
| 11,775,271 B1 | 10/2023 | Singh et al. | |
| 12,346,666 B2 | 7/2025 | De Vrieze et al. | |
| 2007/0122792 A1* | 5/2007 | Galley | G09B 7/02 434/353 |
| 2007/0233460 A1* | 10/2007 | Lancaster | G06F 40/211 704/9 |
| 2008/0077395 A1* | 3/2008 | Lancaster | G06F 40/47 704/9 |
| 2009/0240539 A1* | 9/2009 | Slawson | G06N 20/00 705/7.29 |
| 2010/0223047 A1* | 9/2010 | Christ | G06F 40/274 704/4 |
| 2010/0262621 A1 | 10/2010 | Ross et al. | |
| 2011/0066469 A1* | 3/2011 | Kadosh | G06Q 50/10 705/7.27 |
| 2011/0066556 A1* | 3/2011 | Kadosh | G06Q 50/188 705/347 |
| 2011/0077934 A1* | 3/2011 | Kanevsky | G06Q 20/102 705/40 |
| 2011/0225104 A1* | 9/2011 | Soricut | G06F 40/58 705/348 |
| 2011/0282795 A1* | 11/2011 | Kadosh | G06Q 50/188 705/7.42 |
| 2012/0046934 A1* | 2/2012 | Cheng | G06F 40/51 704/E11.001 |
| 2012/0095747 A1* | 4/2012 | Ross | G06F 40/47 704/E11.001 |
| 2012/0197957 A1* | 8/2012 | de Voogd | G06F 16/972 709/201 |
| 2012/0221321 A1 | 8/2012 | Nakamura et al. | |
| 2012/0265711 A1* | 10/2012 | Assche | G06Q 10/063112 705/400 |
| 2013/0055074 A1* | 2/2013 | Trese | G06F 16/9577 715/255 |
| 2013/0067055 A1* | 3/2013 | Cheng | G06F 16/958 709/223 |
| 2013/0124185 A1 | 5/2013 | Sarr et al. | |
| 2013/0262986 A1* | 10/2013 | Leblond | G06F 40/106 715/236 |
| 2014/0006006 A1* | 1/2014 | Christ | G06F 40/58 704/2 |
| 2014/0114642 A1* | 4/2014 | van den Oever | G06F 40/44 704/2 |
| 2015/0154180 A1* | 6/2015 | Trese | G06F 40/47 704/2 |
| 2016/0162478 A1* | 6/2016 | Blassin | G06Q 10/063112 706/12 |
| 2016/0328392 A1* | 11/2016 | Condie | G06F 40/58 |
| 2017/0076199 A1 | 3/2017 | Zhang et al. | |
| 2017/0124069 A1* | 5/2017 | Bondarchuk | G06F 40/58 |
| 2018/0143975 A1* | 5/2018 | Casal | G06F 40/51 |
| 2019/0042566 A1* | 2/2019 | Marcu | G06Q 10/0639 |
| 2019/0147006 A1 | 5/2019 | Morris | |
| 2019/0156817 A1 | 5/2019 | Li et al. | |
| 2019/0197116 A1* | 6/2019 | Vlad | G06N 3/0499 |
| 2019/0205396 A1 | 7/2019 | Gubanov et al. | |
| 2020/0065341 A1 | 2/2020 | Reshadi et al. | |
| 2020/0089774 A1* | 3/2020 | Tu | G06F 40/58 |
| 2020/0167529 A1* | 5/2020 | Bondarchuk | G06F 40/106 |
| 2021/0019373 A1 | 1/2021 | Freitag et al. | |
| 2021/0042475 A1 | 2/2021 | Zhang et al. | |
| 2021/0157991 A1 | 5/2021 | Wang et al. | |
| 2021/0174033 A1 | 6/2021 | Xiong | |
| 2021/0194733 A1 | 6/2021 | Huangfu et al. | |
| 2022/0198298 A1* | 6/2022 | Chow | G06Q 10/10 |
| 2023/0070302 A1* | 3/2023 | Kovacs | G06F 40/58 |
| 2023/0274102 A1 | 8/2023 | Marie et al. | |
| 2024/0152706 A1 | 5/2024 | De Vrieze | |

FOREIGN PATENT DOCUMENTS

| | | | | |
|---|---|---|---|---|
| WO | WO-2013148930 A1 * | 10/2013 | | G06F 40/47 |
| WO | WO2019133506 A1 | 7/2019 | | |

OTHER PUBLICATIONS

Heinisch, Barbara, and Katia Iacono. "Attitudes of professional translators and translation students towards order management and translator platforms." The Journal of Specialised Translation 32 (2019): 61-89. (Year: 2019).*

* cited by examiner

TRANSLATION DECISION ASSISTANT

CROSS-REFERENCE TO RELATED APPLICATION(S)

None.

FIELD

The present disclosure is directed to systems and methods for optimizing translation management systems including the use of data analytics and machine learning.

BACKGROUND

It should not be assumed that any of the approaches described in this section qualify as prior art merely by virtue of their inclusion in this section. Past translation management systems receive from a client a document for translation, translate the document, and provide the translated document back to the client. A translation project manager makes decisions on the document content domain to select a translator having experience working on this type of a document and the requisite performance quality and speed. Further, given the client criteria and budget and potentially the requirement for special processing (security), the project manager will try to select a translator/reviewer to meet the client's quality, cost requirements, and special needs. However, a project manager may have tens of thousands of translators from which to choose, potentially located around the world. A document manager may have personal knowledge of a small number of translators and reviews and their history. Thus, it is impossible for a manager to efficiently pick from what can be tens of thousands of translators. Prior document management systems have not taken advantage of knowledge retained by the translation management system to pick the best translator and recommend services needed for efficient translation.

Another challenge facing translation management systems is working with documents that have PII (personally identifiable information) or other sensitive information such as credit card numbers. A project manager may not know that a document contains sensitive or PII information given the time needed to review a document for such information. The document may require additional processing steps (re-daction) or be processed in a secure environment. Not knowing these issues often disrupts the translation process, affect the cost, who can work on the project, and the time required for project completion.

What is needed are systems and methods for automatically ranking translators for a translation job and recommending services that the job might require.

SUMMARY

According to various embodiments, the present technology is directed to a computer implemented translation decision assistant. The method begins with receiving a document for translation(s), otherwise referred to as a translation job. Also received is the limitation for cost, time, and quality of the translation job. The document is sent to a trained Translation Decision Assistant (TDA) system. The TDA determines a value for the document based on business metrics and cost, quality and schedule indicated by the customer. The document is then analyzed to determine insights from the document. These insights can include the language, complexity, statistics, whether the document contains named entities including personally identifiable information, and the domain of the document. These insights are evaluated against prior document translation jobs using three techniques to generate ranked resources. The evaluation can include a similarity evaluation, a domain matching evaluation, and a statistical matching evaluation. These evaluations result in multiple groups of ranked resources. These groups are aggregated together based on a voting algorithm or can be used a machine learning algorithm trained on historical human choices and outcomes. The resources are fed into a constraint filter utilizing hard and soft constraints. These constraints can include certification, languages, permissions quality, availability, cost, and service level of the translators. The constraint filter provides three outputs with resources ranked by cost, time, and quality. The decision filter allocates among these ranked resources based on the value of the document and the original customer choice to prioritize cost, quality or turnaround time.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The following detailed description includes references to the accompanying drawings, which form a part of the detailed description. The drawings show illustrations in accordance with example embodiments of the Translation Decision Assistant (TDA). These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

One or more embodiments of the present disclosure include methods of and systems for assisting in decisions for translation tasks based on the document to be translated, information about resources to be used, constraints, and other limitations. These tasks include selection of translator (s) and/or reviewer(s), a machine translation engine, a terminology database, choosing a service level, prioritizing quality/cost/turnaround time, and choosing a processing path or flow. Based on generated insights regarding a document are input into up to three methods of ranking translators. These include a machine learning "Similarity" evaluation, a "Domain Matching" evaluation, and a "Statistical Matching" evaluation of the document insights. The output of the Similarity, Domain, and Statistical evaluation are input into an Aggregation learning machine. The Aggregation learning machine outputs ranked translators, computer supplied translation methods, and workflow steps. These ranked outputs are inputs to a "Constraint Solver" process. The aggregation learning machine can be implemented as a neural network.

The constraint solver utilizes soft and hard constraints to provide the options of ranking by cost, quality, and time. The hard constraints include translator certification, languages, and translator permissions. The soft constraints include a translator's history of general quality determined from the document insights step, availability, costs, and service levels.

The statistics and complexity can include but are not limited to lengths of words and sentences, types of sentences used, and mix of words and verbs. The "named entities" can include personal information, phone number, account information, or classification that may need redaction or to be translated by a person with special clearances, access, and vetting. The domains refer to the subject area of the document. Examples of these domains are medical, science, technical, and business documents.

Identified service attributes can include whether a document needs to be processed in a special environment, and whether redactions are needed to remove personal or sensitive information.

Figure 1:
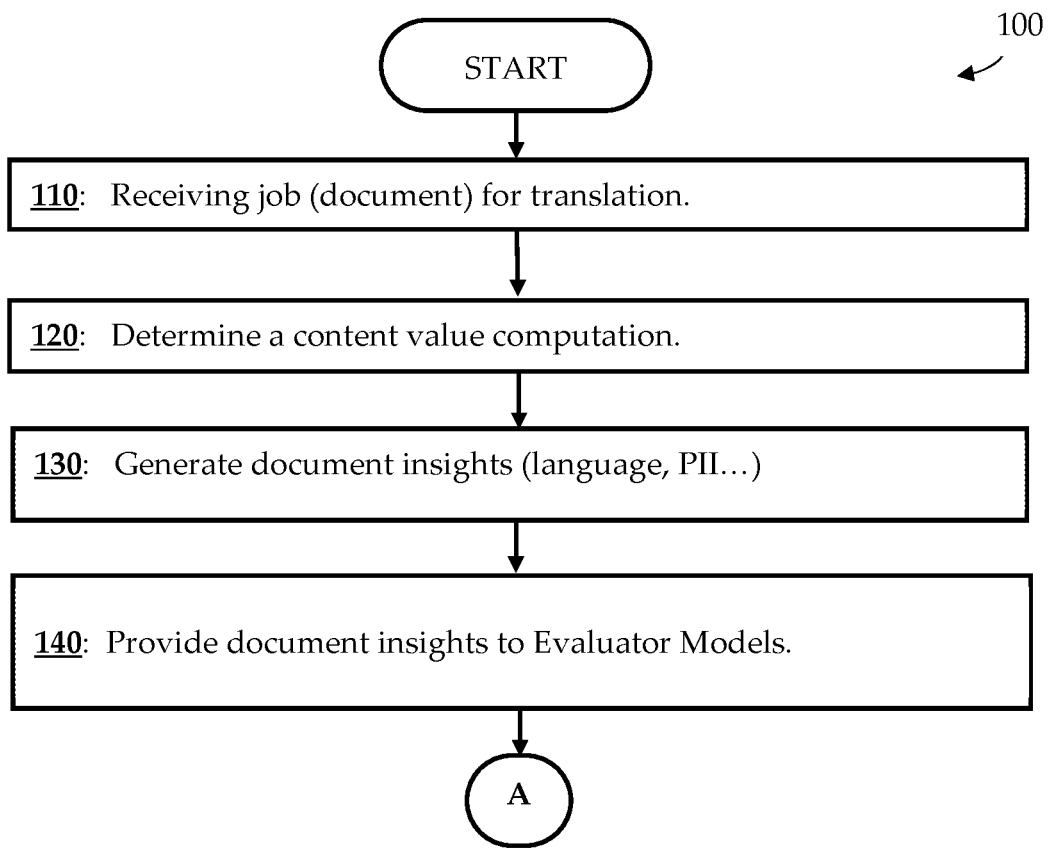
FIG. 1 is a flowchart of an embodiment of generating document insights.

Referring to FIG. 1, a process 100 for determining content insights CI is shown and described below. In step 110, the CI receives a document. In some embodiments, a portion of the document is sufficient for the CI. Documents can be thousands of pages where analysis of a representative sample can be sufficient for determining the content insights.

In step 120, a content value is quantified. The quantification can be from the customer or from business rules and usage. The term "value", also referred to as "job value", describes how impactful the content is likely to be to the customer's business. Value is determined based on the document content and the customer's business, but the concept of 'Value' is important as it will determine the needed output and outcome, the job service level required, and accordingly the cost of the job. The value is different from the job quality which can be determined by measuring the number of errors and error severity.

Value can be measured in a number of ways and can be part of setting up of a system implementing the method disclosed herein. Determination of the "value" can include one or more of the business performance of the subject, the type, the risk, the longevity, and the visibility of the content.

The "business performance of the subject" is the related subject of the content for translation. An example of the business performance of the subject is a new product release and the market to which the product is to be released which relates to the amount of business revenue that will be generated from the product release. Release into a small market will have a smaller value than a release into a larger market.

The "type" is how the translation content is to be used. A marketing banner will have higher value than a knowledge base item such as an entry into a database. For example, a translation of the intent and emotional connection of a marketing message versus the accuracy of a knowledge base item would have different values.

Acceptable Risk is the tolerance to poor content performance. Low tolerance would indicate a higher Value. Content covered by regulation carries a higher impact of translation content failure. Thus, regulations are an example of a high risk, low tolerance, and thus would contribute to high value and subsequent service selection.

Longevity of the content relates to how long the content will be relevant. A social media post or internal CEO update will have a shorter life than a knowledge base item.

The "visibility" of the content relates to how broadly the content is expected to be distributed and seen. A website homepage will have more visibility than content stored in a knowledge database.

How these variables are combined, weighted, and mixed to generate a "value" measure can be implemented through a template for many translation jobs. Alternatively, a custom equation can be used. Universally, the "value" measure for a piece of content will be calculated, and that output from this function in the invention will be incorporated into the determination of the services which should be applied for translation.

In step 130, document insights are generated by the CI. The insights can include but are not limited to language(s), named entities, domain, complexity, and personally identifiable information (PII). The PII and named entities are information that may need to be redacted from the document or require special handling. PII information can include but is not limited to names, emails, credit card numbers, and phone numbers. The domain is the document's characteristics including but not limited to medical, business, and scientific documents.

In step 140, the generated insights are sent or provided to the evaluator models. There can be up to three evaluator models but the invention contemplates more than three models.

Figure 2:
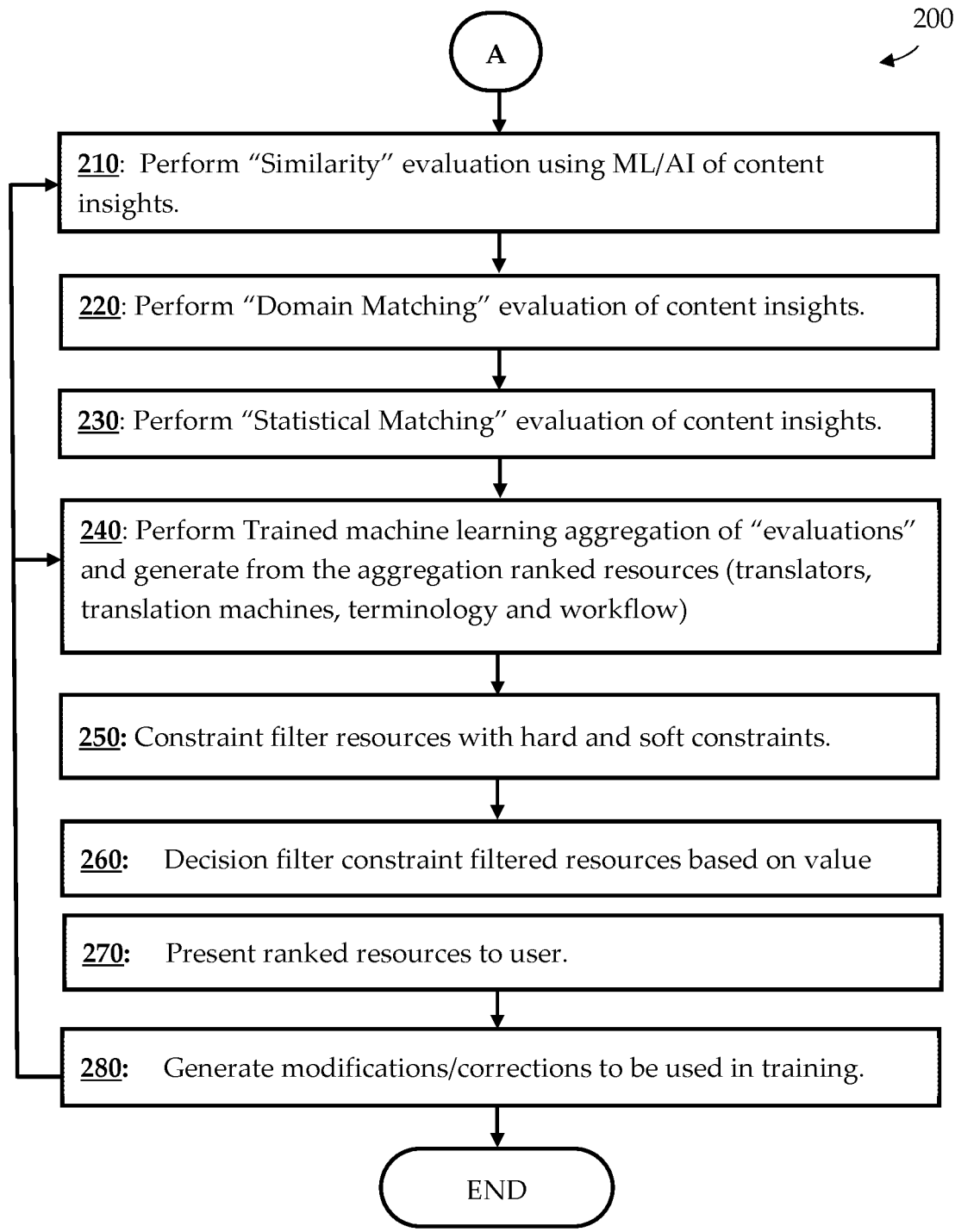
FIG. 2 is a flow chart of an embodiment of a Translation Decision Assessment System evaluating insights and filtering them to receive ranked resource recommendations.

Referring to FIG. 2, the resource evaluation process 200 is shown and described. The resource evaluation process 200 utilizes a plurality of evaluation techniques to generate a ranking of translators/reviewers, machine translation engines, and workflow steps.

In step 210, a trained Similarity Evaluation Machine (SEV) performs an evaluation of content insights. The SEV is a learning machine that has been trained with job history data and content insights. The job history data can include the translator and their timeline, and job scoring. Job scoring can include automated, internally generated, and customer-generated information regarding quality, cost, and time. The SEV utilizes dynamic clustering of jobs using content insights and the content value and job history data of the translators and machine translation engines. The clustering method can be modeling of topics using n-grams forming a non-exclusive grouping formed by determining representing labels formed in advance of the clustering of jobs. Alternatively, the clustering method can utilize a bisecting k-mean algorithm resulting in an exclusive association with a cluster. Upon forming a cluster, metrics on the grouped jobs where the document/job under evaluation are evaluated to generate an assessment of translators, machine translation engines, translation memories, and terminology. Additionally, a schedule and quality estimation can be generated. The assessment can be ranked, can include a schedule, and can be used to identify resources with related schedule and quality estimations.

In step 220, a "Domain Matching" evaluation is performed on the content insights. For domain matching, a set of prespecified domains are selected according to one or more taxonomies. Historical job content is classified according to one of the prespecified domains according to the taxonomies. The document under evaluation, the current job, is matched to one historical content domain. The match can be based on proportional domain certainty matching. From this match, metrics and resources can be extracted from historical jobs with the same domain matching. These include translators, timelines, and job scoring as described above. From this, a list of resources, translators, machine translation engines, translation memories, terminology, and quality estimations are generated. This can be a ranked list.

In step 230, a "Statistical Matching" evaluation is performed on the content insights. This evaluation applies dynamic clustering of historical jobs based on the content characteristics/insights of the historical jobs and the value evaluations and specific terminology. For clustering, the method applies a statistical weighting algorithm to find the group of historical jobs having the most commonalities with the document or job under evaluation. After identifying the group, metrics on the job are collected from this group. From these metrics, a list of resources, translators, machine translation engines, translation memories, terminology, and quality estimations are generated.

In step 240, the results of the evaluations are input into an aggregation process which is a trained learning machine which can include a neural network. In one embodiment, a score is generated for each evaluation and the outputs for each evaluation are ranked. In another embodiment, the ranking algorithm gives more weight to the evaluation that has the most commonality between evaluation results. In one embodiment, the aggregation process identifies common resources (translators, machine translation engines, translation memories, terminology) and a determination is made if the common resources can form another proposal. The output of this step is an ordered list of resources for the translation job including translators, machine translation engines, translation memories, terminology sets with a related schedule and quality estimation.

In step 250, a constraint filter is applied to ranked resources identified in the aggregation step 240. Where the step 240 may have identified a ranking of translators that would best meet the constraints of cost, time, and quality, these resources may not be available at the needed time. The constraint filter applies external constraints to the identified resources.

Two types of constraints may be applied to the external resources identified by the aggregation step 240. These are hard constraints and soft constraints. The hard constraints include certifications, languages, and permissions of translators. The soft constraints include quality, availability, cost, and service levels. The constraint filter can output three ranked resource outputs. One output can be ranked based on cost, one based on quality, and one based on time. These outputs can be sent to a decision filtering step 260.

The Translation Management System (TMS) implements a security model which provides configurable models in which one can define who has access and what kind of resources or translation projects to which a translator has access. The permissions can apply to both people and to informational resources.

For example, a translator, even if it would be best deemed a good match for a job by previous steps 210, 220, 230, and 240, might not be eligible to work or participate on the job by the TMS security configuration. An example of a reason preventing a translator from participating on a job is that the translation project is being run in a certain area of a company where only specific people are allowed to work on the job. Another example is that the project has a security level for which a translator does not have the required clearances.

The same permissions restrictions can apply to resources. For example, a translation memory or terminology or a machine translation engine could be deemed usable for the job by previous analysis but is not accessible based on a security constraint. These constraints or restrictions can be that a resource is stored in an electronic location with restricted access while the translation job could be triggered as part of another location in the company which does not have visibility into the location where that resource exists.

A benefit of not applying security constraints before the earlier steps 210-240 is that using the information and machine processing can determine potentially useful resources to solve a job, even if they are under security restrictions. While the translation job may be subject to those restrictions which can be enforced, the information provided by applying the analysis steps of 210-240 to the resources that are security constrained can provide important information related to system governance and improved perspective on situations where the system can be improved. Potentially the security constraints are too rigid and need to be reviewed, and thereby unlocking more business benefits.

In step 260, decision filtering is applied to the output of the constraint filtering. The decision filtering can be based on estimated content value and the customer's input of the importance of price, schedule, and quality. This step can be automated and based on the content value metric.

In step 270, the ranked resources results may be optionally presented to a user. The results can be a report, email, displayed on a video screen or by other manner of communication.

In step 280, the ranked resource results can be optionally modified by human intervention. These modifications can be sent to the historical job database to be used to update the learning machines.

Alternatively, the ranked resources may be used directly by the TMS to assign and route to the best matched resources for the task based on customer preference for cost, quality or turnaround time.

Figure 3:
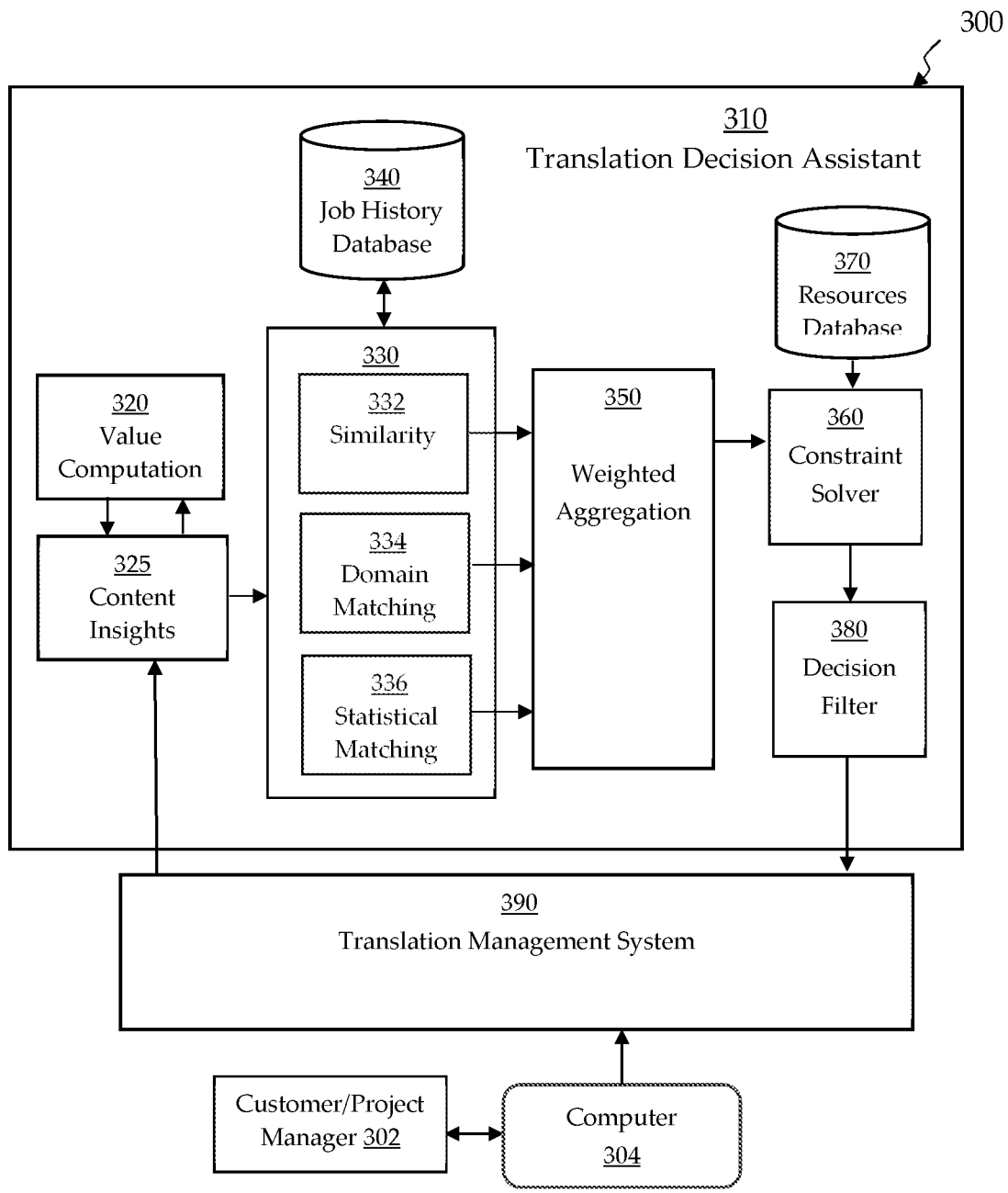
FIG. 3 is an example system for implementing a Translation Decision Assessment System.

Referring to FIG. 3, shows a block diagram of a Translation Decision Assistant (TDA) System 300. The TDA 300 is comprised of software components and databases that are executed on one or more processors and can execute on processors in different locations. At a top level the system is comprised of customer/project manager 302 who interfaces with a computer 304. The computer interfaces with a Translation Management System 390 for the management of translation jobs. The translation management system 390 communicates with the Translation Decision Assistant 310 which provides ranked recommendations of resources fitting system constraints. The resources can include translators, machine translation engines, translation memory resources, terminology database to use, and workflow process. The communication can be through wired or wireless networks.

Translation memory resources are part of a system which records previous translations. An example of a previous translation is a translation of English to French. These translations, which can be referred to as "memories," can be reused in future translations either in their entirety if the translation is found in the same context or partially reused if the text resembles the original one to some degree.

It's a common problem in the translation industry that such memories can encompass tens of thousands or more of memories. The process of identifying a memory that would be useful in a translation can be cumbersome or problematic. By using the below disclosed methods of "Similarity" machine learning/AI, "Domain Learning" and "Statistical Matching", the disclosed invention provides an improved method to utilize "translation memories".

The TDA is comprised of a number of components. These include a value computation component 320, a content insights component 325, an evaluation component 330, a job history database 340, and aggregation component 350, a constraint solver 360, a resources database 370, and decision filter 380. The evaluation component 330 can include a Similarity 332 software component, a domain matching evaluator software component 334, and a statistical matching 336 component. The operation of each of these components is described above within the method description of FIG. 2.

Figure 4:
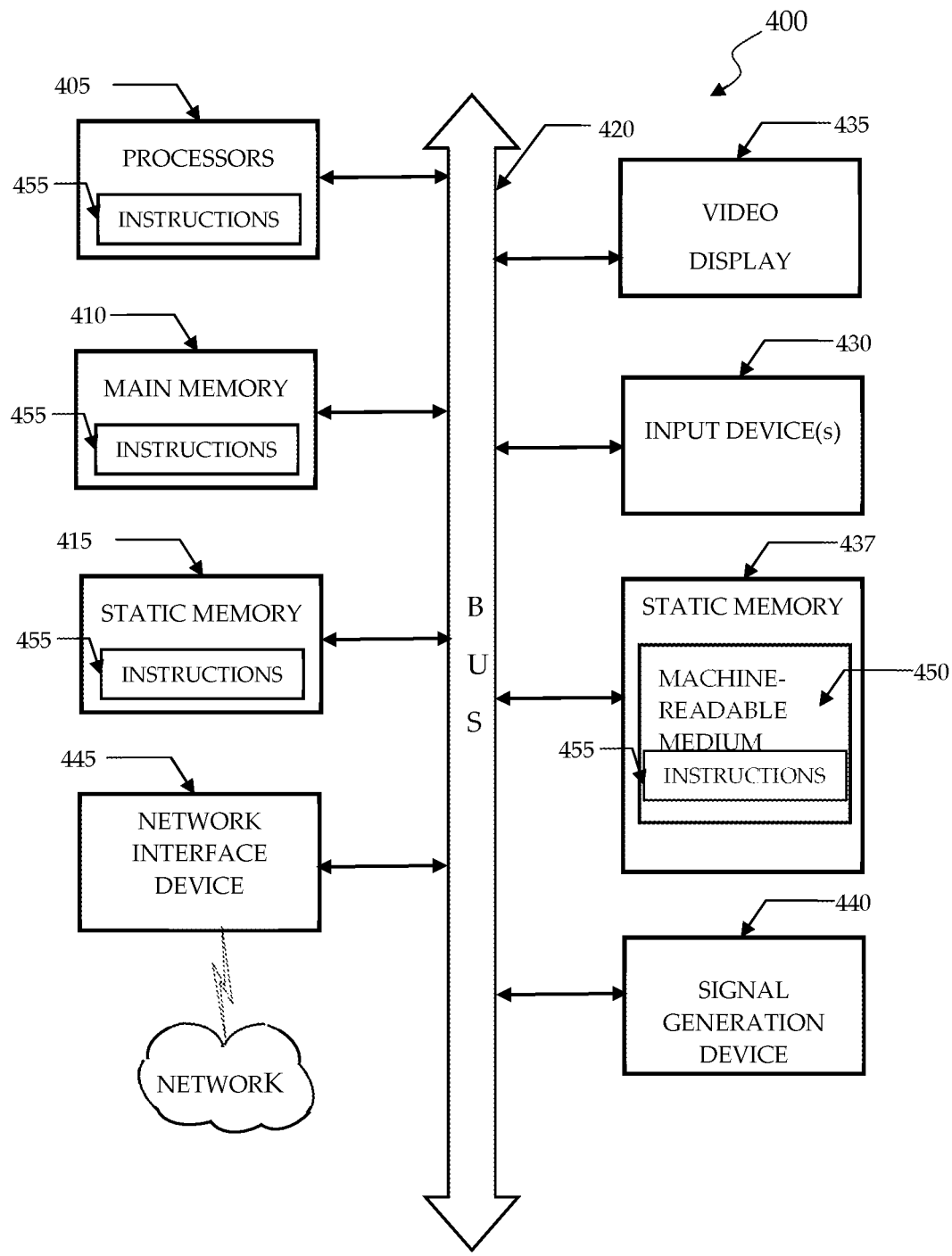
FIG. 4 is a schematic diagram of an example computer device that can be utilized to implement aspects of the present technology.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), handheld computer system, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, ANDROID, IOS, CHROME, TIZEN and other suitable operating systems.

The processing for various embodiments may be implemented in software that is cloud-based. The computer system 400 may be implemented as a cloud-based computing environment. In other embodiments, the computer system 400 may itself include a cloud-based computing environment. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users).

FIG. 4 is a diagrammatic representation of an example machine in the form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 405 (e.g., a central processing unit (CPU), a graphics processing unit (GPU), Digital Signal Processor, Neural Processor Unit (NPU) or any combination thereof), and a main memory 410 and static memory 415, which communicate with each other via a bus 420. The computer system 400 may further include a video display 435 (e.g., a liquid crystal display (LCD)). The computer system 400 may also include an alpha-numeric input device(s) 430 (e.g., a keyboard), a cursor control device (e.g., a mouse), a voice recognition or biometric verification unit (not shown), a drive unit 437 (also referred to as disk drive unit), a signal generation device 440 (e.g., a speaker), and a network interface device 445. The computer system 400 may further include a data encryption module (not shown) to encrypt data.

The drive unit 437 includes a computer or machine-readable medium 450 on which is stored one or more sets of instructions and data structures (e.g., instructions 455) embodying or utilizing any one or more of the methodologies or functions described herein. The instructions 455 may also reside, completely or at least partially, within the main memory 410 and/or within static memory 415 and/or within the processors 405 during execution thereof by the computer system 400. The main memory 410, static memory 415, and the processors 405 may also constitute machine-readable media.

The instructions 455 may further be transmitted or received over a network via the network interface device 445 utilizing any one of a number of well-known transfer protocols (e.g., Hyper Text Transfer Protocol (HTTP)). While the machine-readable medium 450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 400 are required and thus portions of the computer system 400 can be removed if not needed, such as Input/Output (I/O) devices (e.g., input device(s) 430). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purposes only and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for optimizing processing of translation resource allocation, the method comprising:
    receiving a document for a translation job;
    receiving cost, time, and quality parameters for the translation job;
    determining a value for the document;
    generating document insights;
    executing instructions stored in a memory by one or more processors to execute, via a plurality of specialized evaluation engines, a plurality of evaluations of the document insights based on historical job data, the plurality of specialized evaluation engines comprising:
    a similarity evaluation machine performing dynamic clustering using the historical job data;
    a domain matching engine performing proportional domain certainty matching; and
    a statistical matching engine performing a statistical matching evaluation using weighted commonality analysis comprising;
    generating clusters based on characteristics of the historical job data and content value estimations, and specific terminology;
    determining a matching cluster with most commonalities with document characteristics, the value for the document, and the specific terminology; and
    determining ranked resources from the historical job data that are consistent with the matching cluster;
    generating a plurality of ranked resources based on the plurality of evaluations;
    based on the plurality of ranked resources provided by the plurality of evaluations, determining aggregated ranked resources and workflow with an aggregation machine learning system, the aggregation machine learning system comprising a neural network, the aggregation machine learning system using a machine learning algorithm trained on historical human choices and outcomes to determine the aggregated ranked resources, the aggregation machine learning system further configured to determine the aggregated ranked resources by:
    generating a score for each of the plurality of evaluations; and
    ranking the plurality of ranked resources provided by the plurality of evaluations;
    applying a constraint solver to the aggregated ranked resources based on hard constraints and soft constraints by executing the instructions stored in the memory by the one or more processors, wherein the aggregated ranked resources are fed into a constraint filter to generate a ranked resource list, the ranked resource list comprising a plurality of translation memories useful for the translation job;
    generating a security model by a Translation Management System (TMS), the security model having location-specific security configurations to control access to translation resources and the plurality of translation memories based on translation job-specific security levels; and
    utilizing the ranked resource list by the TMS to:
    automatically assign and route best matched resources for the translation job;
    identify which of the plurality of translation memories from the ranked resource list fit the translation job-specific security levels that are enforced by the security model; and
    based on the identification, provide, by the security model, visibility of and access to the identified translation memories that are to be utilized for the translation job.

2. The method of claim 1, wherein the document insights include language, personal identifiable information, and a document domain.

3. The method of claim 1, wherein the historical job data includes job scoring for a plurality of translators.

4. The method of claim 3, wherein the job scoring includes quality, cost, and time.

5. The method of claim 1, wherein the similarity evaluation machine uses multiple different methods of clustering, where metrics from the historical job data of cluster groups are evaluated against the document.

6. The method of claim 1, wherein the proportional domain certainty matching generates a plurality of domains and determines from the plurality of domains, a domain best matching a document domain, and based on the domain best matching the document domain, selecting resources with overlapping metrics based on the historical job data.

7. The method of claim 1, wherein the ranked resources of the ranked resource list are ranked by cost, quality, and time.

8. The method of claim 1, wherein the hard constraints are certification, languages, and permission, and wherein the soft constraints are quality, availability, cost, and service levels.

9. The method of claim 1, further comprising modifying the ranked resource list.

10. The method of claim 9, further comprising transmitting the modified ranked resource list to a database in order to update and train the aggregation machine learning system.

11. The method of claim 1, further comprising presenting the ranked resource list in a report, an email, or on a display to a user.

12. The method of claim 1, wherein the utilizing the ranked resource list by the Translation Management System (TMS) to automatically assign and route the best matched resources for the translation job is based on customer preferences for cost, quality, or turnaround time.

13. A computer-implemented system for optimizing processing of translation resource allocation, comprising:
one or more hardware processors configured by machine-readable instructions to:
receive a document for a translation job;
receive cost, time, and quality parameters for the translation job;
determine a value for the document;
generate document insights;
execute instructions stored in a memory by the one or more hardware processors to execute, via a plurality of specialized evaluation engines, a plurality of evaluations of the document insights based on historical job data, wherein the plurality of specialized evaluation engines comprise: a similarity evaluation machine performing dynamic clustering using the historical job data; a domain matching engine performing proportional domain certainty matching; and
a statistical matching engine performing a statistical matching evaluation using weighted commonality analysis comprising;
generating clusters based on characteristics of the historical job data and content value estimations, and specific terminology;
determining a matching cluster with most commonalities with document characteristics, the value of the document, and the specific terminology; and
determining ranked resources from the historical job data that are consistent with the matching cluster;
generate a plurality of ranked resources based on the plurality of evaluations;
based on the plurality of ranked resources provided by the plurality of evaluations, determine aggregated ranked resources and workflow, using an aggregation machine learning system comprising a neural network, the aggregation machine learning system using a machine learning algorithm trained on historical human choices and outcomes to determine the aggregated ranked resources, the aggregation machine learning system further configured to determine the aggregated ranked resources by:
generating a score for each of the plurality of evaluations; and
ranking the plurality of ranked resources provided by the plurality of evaluations;
apply a constraint solver to the aggregated ranked resources based on hard constraints and soft constraints, wherein the aggregated ranked resources are fed into a constraint filter to generate a ranked resource list, the ranked resource list comprising a plurality of translation memories useful for the translation job;
generate a security model by a Translation Management System (TMS), the security model having location-specific security configurations to control access to translation resources and the plurality of translation memories based on translation job-specific security levels; and
utilize the ranked resource list by a Translation Management System (TMS) to:
automatically assign and route best matched resources for the translation job;
identify which of the plurality of translation memories from the ranked resource list fit the translation job-specific security levels that are enforced by the security model; and
based on the identification, provide, by the security model, visibility of and access to the identified translation memories that are to be utilized for the translation job.

14. The system of claim 13, wherein the document insights include language, personal identifiable information, and a document domain.

15. The system of claim 13, wherein the historical job data includes job scoring for a plurality of translators.

16. The system of claim 15, wherein the job scoring includes quality, cost, and time.

17. The system of claim 13, wherein the similarity evaluation machine uses multiple different methods of clustering, where metrics from the historical job data of cluster groups are evaluated against the document.

18. The system of claim 13, wherein the proportional domain certainty matching generates a plurality of domains and determines from the plurality of domains, a domain best matching a document domain, and based on the domain best matching the document domain, selecting resources with overlapping metrics based on the historical job data.

19. The system of claim 13, wherein the ranked resources are ranked by cost, quality, and time.

20. A computer-implemented system for automated translation resource management, comprising:
at least one processor configured to execute a Translation Management System
(TMS), the TMS comprising:
a memory architecture including a plurality of translation memories, machine translation servers, and translation resource metadata repositories, wherein the memory architecture enforces security configurations to control access to subsets of translation resources;
a network interface configured to receive electronic documents and associated data for translation processing, the associated data including automatically generated content insights derived from predefined evaluation criteria;
a plurality of evaluation engines configured to execute executable instructions stored in a memory by the at least one processor, the executable instructions to execute a plurality of evaluations of document insights based on historical job data, the plurality of evaluation engines comprising:
a statistical matching engine configured to perform a statistical matching evaluation using weighted commonality analysis comprising:
generating clusters based on characteristics of the historical job data and content value estimations, and specific terminology;
determining a matching cluster with most commonalities with document characteristics, value for a document, and the specific terminology; and
determining ranked resources from the historical job data that are consistent with the matching cluster;
a similarity evaluation machine configured to perform dynamic clustering using the historical job data; and
a domain matching engine configured to perform proportional domain certain matching;

a machine learning aggregation module, comprising a neural network trained on the historical job data, configured to determine aggregated ranked resources and workflow based on a plurality of ranked resources provided by the plurality of evaluations, the machine learning aggregation module using a machine learning algorithm trained on historical human choices and outcomes to determine the aggregated ranked resources, the machine learning aggregation module further configured to determine the aggregated ranked resources by:

generating a score for each of the plurality of evaluations; and ranking the plurality of ranked resources provided by the plurality of evaluations;

a constraint solver configured to be applied to the aggregated ranked resources based on hard constraints and soft constraints, wherein the aggregated ranked resources are fed into a constraint filter to generate a ranked resource list, the ranked resource list comprising a plurality of translation memories useful for a translation job; and the TMS being configured to:

generate a security model having location-specific security configurations to control access to translation resources and the plurality of translation memories based on translation job-specific security levels;

automatically assign and route best matched resources for the translation job;

identify which of the plurality of translation memories from the ranked resource list fit the translation job-specific security levels that are enforced by the security model; and based on the identification, provide, by the security model, visibility of and access to the identified translation memories that are to be utilized for the translation job.

* * * * *